(12) United States Patent
Henson

(10) Patent No.: US 12,304,177 B2
(45) Date of Patent: May 20, 2025

(54) CERAMIC MATRIX COMPOSITE (CMC) COMPONENT RESISTANT TO EDGE CRACKS

(71) Applicant: General Electric Company, Schenectady, NY (US)

(72) Inventor: Grant Henson, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/307,064

(22) Filed: Apr. 26, 2023

(65) Prior Publication Data
US 2024/0359434 A1 Oct. 31, 2024

(51) Int. Cl.
*B32B 5/12* (2006.01)
*B32B 18/00* (2006.01)
*F02C 7/00* (2006.01)

(52) U.S. Cl.
CPC .......... *B32B 18/00* (2013.01); *B32B 5/12* (2013.01); *F02C 7/00* (2013.01); *B32B 2307/552* (2013.01); *B32B 2603/00* (2013.01); *F05D 2300/6033* (2013.01)

(58) Field of Classification Search
None
See application file for complete search history.

(56) References Cited

U.S. PATENT DOCUMENTS
2007/0075455 A1   4/2007  Marini et al.
2019/0170013 A1*  6/2019  Tura .................... B32B 5/12

FOREIGN PATENT DOCUMENTS
GB          2521736 A       7/2016

* cited by examiner

*Primary Examiner* — Alexander S Thomas
(74) *Attorney, Agent, or Firm* — Dority & Manning, P.A.

(57) ABSTRACT

A ceramic matrix composite (CMC) component includes a plurality of CMC plies stacked together to form a laminate structure. First and second CMC plies of the laminate structure are formed from a CMC material reinforced with a fiber material and have first and second fiber orientations, respectively. The first and second fiber orientations are arranged in a cross-ply pattern in a plane of the laminate structure. The laminate structure includes at least one edge. The CMC component further includes at least one end cap ply covering at least a portion of the at least one edge of the laminate structure. The end cap ply is formed of the CMC material reinforced with the fiber material having a third fiber orientation. Further, at least a portion of a plane of the at least one end cap ply is perpendicular to the plane of the laminate structure.

20 Claims, 7 Drawing Sheets

CERAMIC MATRIX COMPOSITE (CMC) COMPONENT RESISTANT TO EDGE CRACKS

FIELD

The present disclosure relates generally to ceramic matrix composites, and more particularly to ceramic matrix composites resistant to edge cracks, which are particularly useful as components for gas turbine engines.

BACKGROUND

The design of modern gas turbine engines is driven by the demand for higher turbine efficiency. It is therefore desirable to operate the turbines at the highest possible temperatures. For any engine cycle compression ratio or bypass ratio, increasing the turbine entry gas temperature produces more specific thrust (e.g., engine thrust per unit of air mass flow). However, as turbine entry temperatures increase, it is necessary to develop components and materials better able to withstand the increased temperatures. Accordingly, ceramic matrix composites ("CMCs") are an attractive material for turbine applications, as CMCs have high temperature capability and are light weight.

CMCs can be manufactured using a variety of techniques. For example, CMC components may be laminated from unidirectional prepreg tape, having at least one edge perpendicular to the plane of the tape. In such configurations, however, in-plane tensile stress on the edge can initiate a translaminar matrix crack and/or cause such a crack to grow from a pre-existing flaw or scratch. Thus, an improved design for CMC laminates that is resistant to edge cracks is desirable in the art.

BRIEF DESCRIPTION OF THE DRAWINGS

A full and enabling disclosure of the present embodiments, including the best mode thereof, directed to one of ordinary skill in the art, is set forth in the specification, which makes reference to the appended figures, in which.

Figure 1A:
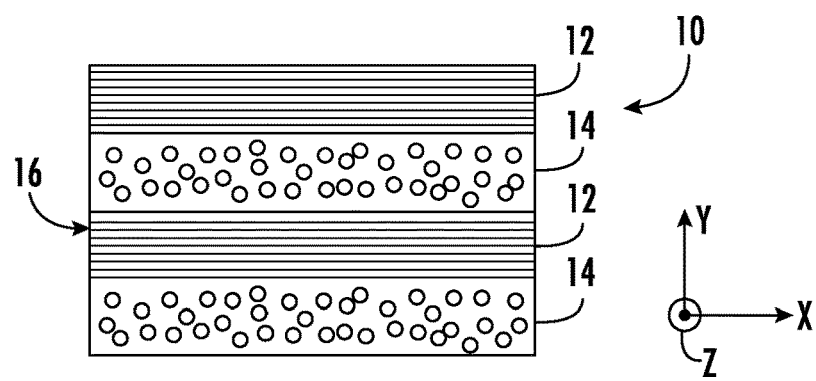
FIG. 1A is a cross-section of a CMC component in accordance with conventional construction.

Repeat use of reference characters in the present specification and drawings is intended to represent the same or analogous features or elements of the present invention.

DETAILED DESCRIPTION

Reference now will be made in detail to embodiments of the present disclosure, one or more examples of which are illustrated in the drawings. Each example is provided by way of explanation of the embodiments disclosed herein, not limitation thereof. In fact, it will be apparent to those skilled in the art that various modifications and variations can be made to the embodiments of the present disclosure without departing from the scope or spirit of the various embodiments described. For instance, features illustrated or described as part of one embodiment can be used with another embodiment to yield a still further embodiment. Thus, it is intended that the present disclosure covers such modifications and variations as come within the scope of the appended claims and their equivalents.

Figure 1B:
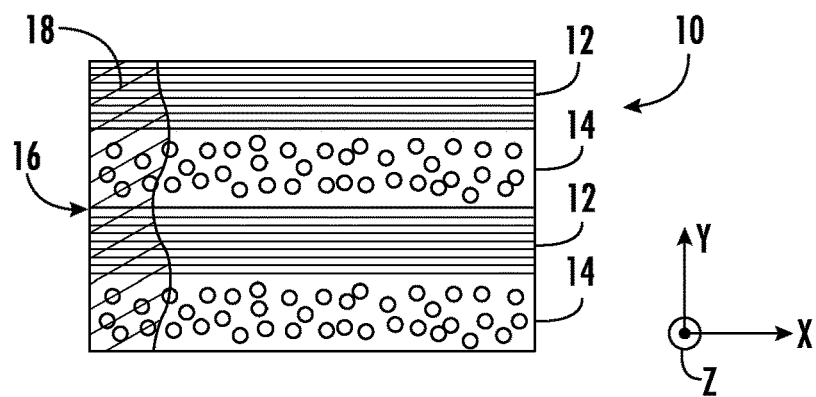
FIG. 1B is a cross-section of a CMC component in accordance with conventional construction, particularly illustrating the CMC component having an edge crack.
Figure 1C:
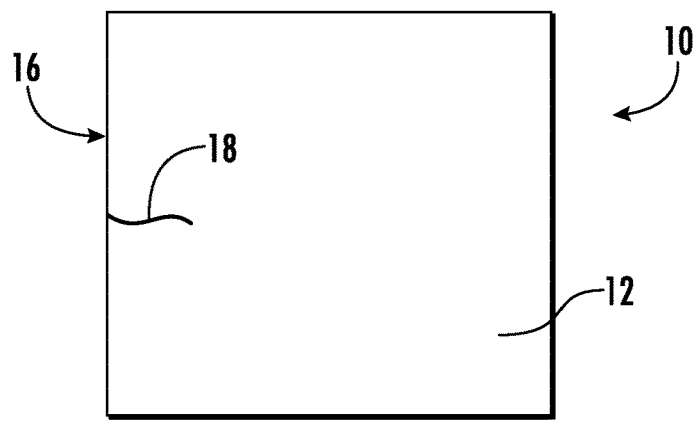
FIG. 1C is a top view of the CMC component of FIG. 1B, particularly illustrating the edge crack in the CMC component.

Generally, the present disclosure is directed to ceramic matrix composite ("CMC") components resistant to edge cracks and/or propagation of edge cracks. CMC components laminated from unidirectional prepreg tape or from a two-dimensional preform containing layers of aligned, continuous fibers usually have at least one edge perpendicular to the lamination plane, which may be referred to herein as an "exposed edge". For example, as shown in FIG. 1A, an example cross-section of a CMC component 10 in accordance with conventional construction is illustrated. Further, as shown, the CMC component 10 includes multiple plies 12, 14 stacked together in an alternating or cross-ply pattern. As shown in FIGS. 1B and 1C, in-plane tensile stress on an exposed edge 16 of the CMC component 10 can initiate a translaminar matrix crack 18 or cause one to grow from a pre-existing flaw or scratch. As used herein, "translaminar" generally refers to the plane of the main laminate or stack of aligned fibers. Such cracks can grow rapidly during a single loading cycle or can grow incrementally during each cycle, as a fatigue crack. Further, the translaminar matrix cracks 18 are generally resisted by bridging fibers running perpendicular to the crack plane. However, for one or more design purposes, and as shown in FIGS. 1A and 1B, it may be desirable to orient half or more of the plies (e.g., such as plies 12) in the CMC component 10 such that they offer no bridging fibers to resist a translaminar crack on the exposed edge 16. Thus, the resistance to the translaminar matrix crack 18 on the exposed edge 16 can be half or less than that of a component in which the maximum number of bridging fibers were presented.

The exposed edge(s) are frequently the location of cracks that limit the useful life of CMC components. Accordingly, the present disclosure is configured to increase (e.g., by doubling or more) the resistance to edge cracks and prolong the useful life of the components. In particular, as will be explained herein, the present disclosure is directed to a CMC component having one or more end cap plies added to the exposed edge(s) thereof. In certain embodiments, for example, an end cap ply can be laid up perpendicular to the basic laminate plane such that the end cap ply covers the exposed edge(s). Furthermore, in an embodiment, the one or more end cap plies can be oriented such that all of the fibers therein can bridge a translaminar matrix crack on or in the laminate structure. Thus, in a typical situation where half the plies in the basic laminate offer no bridging fiber to edge cracks, the end cap ply is configured to at least double the resistance to edge cracks.

The systems and methods of the present disclosure can be used to prepare a variety of components including ceramic matrix composites. For instance, the systems and methods of the present disclosure may be used to prepare components in the aviation industry. Further, the systems and methods of the present disclosure may be used to prepare components for gas turbine engines, such as in high pressure compressors (HPC), fans, boosters, high pressure turbines (HPT), and low pressure turbines (LPT) of both airborne and land-based gas turbine engines. For instance, the systems and methods of the present disclosure may be used to prepare components for a turbofan engine or turbomachinery in general, including turbojet, turboprop and turboshaft gas turbine engines, including industrial and marine gas turbine engines and auxiliary power units. For instance, components such as combustion liners, shrouds, nozzles, blades, etc. may be prepared with the present method and materials.

Figure 2:
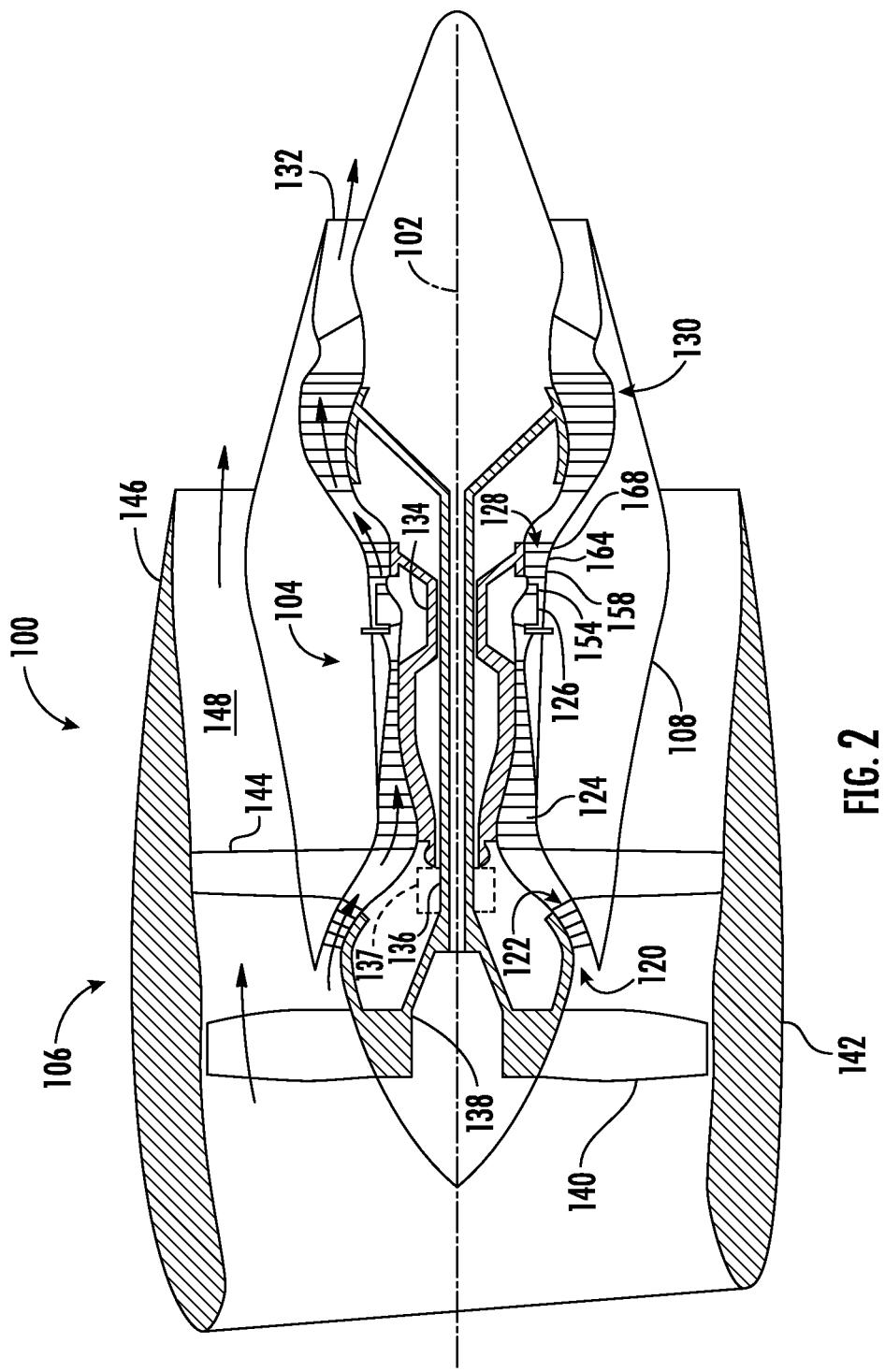
FIG. 2 is a cross-section of an exemplary gas turbine engine in accordance with one embodiment of the present disclosure.

Referring now to FIG. 2, a schematic cross-sectional view of a gas turbine engine in accordance with one embodiment of the present disclosure is illustrated. Although further described below generally with reference to a turbofan engine 100, the present disclosure is also applicable to turbomachinery in general, including turbojet, turboprop and turboshaft gas turbine engines, including industrial and marine gas turbine engines and auxiliary power units.

As shown in FIG. 2, the turbofan engine 100 has a longitudinal or axial centerline axis 102 that extends therethrough for reference purposes. In general, the turbofan engine 100 may include a core turbine or gas turbine engine 104 disposed downstream from a fan section 106.

The gas turbine engine 104 may generally include a substantially tubular outer casing 108 that defines an annular inlet 120. The outer casing 108 may be formed from multiple casings. The outer casing 108 encases, in serial flow relationship, a compressor section having a booster or low pressure (LP) compressor 122, a high pressure (HP) compressor 124, a combustion section 126, a turbine section including a high pressure (HP) turbine 128, a low pressure (LP) turbine 130, and a jet exhaust nozzle section 132. A high pressure (HP) shaft or spool 134 drivingly connects the HP turbine 128 to the HP compressor 124. A low pressure (LP) shaft or spool 136 drivingly connects the LP turbine 130 to the LP compressor 122. The LP spool 136 may also be connected to a fan spool or shaft 138 of the fan section 106. In particular embodiments, the LP spool 136 may be connected directly to the fan spool 138 such as in a direct-drive configuration. In alternative configurations, the LP spool 136 may be connected to the fan spool 138 via a speed reduction device 137 such as a reduction gear gearbox in an indirect-drive or geared-drive configuration. Such speed reduction devices may be included between any suitable shafts/spools within turbofan engine 100 as desired or required.

As shown in FIG. 3, the fan section 106 includes a plurality of fan blades 140 that are coupled to and that extend radially outwardly from the fan spool 138. An annular fan casing or nacelle 142 circumferentially surrounds the fan section 106 and/or at least a portion of the gas turbine engine 104. It should be appreciated by those of ordinary skill in the art that the nacelle 142 may be configured to be supported relative to the gas turbine engine 104 by a plurality of circumferentially-spaced outlet guide vanes 144. Moreover, a downstream section 146 of the nacelle 142 (downstream of the guide vanes 144) may extend over an outer portion of the gas turbine engine 104 so as to define a bypass airflow passage 148 there between.

The HP turbine 128 includes, in serial flow relationship, a first stage of stator vanes 154 (only one shown) axially spaced from turbine rotor blades 158 (only one shown) (also referred to as "turbine blades") and a second stage of stator vanes 164 (only one shown) axially spaced from turbine rotor blades 168 (only one shown) (also referred to as "turbine blades").

Figure 3A:
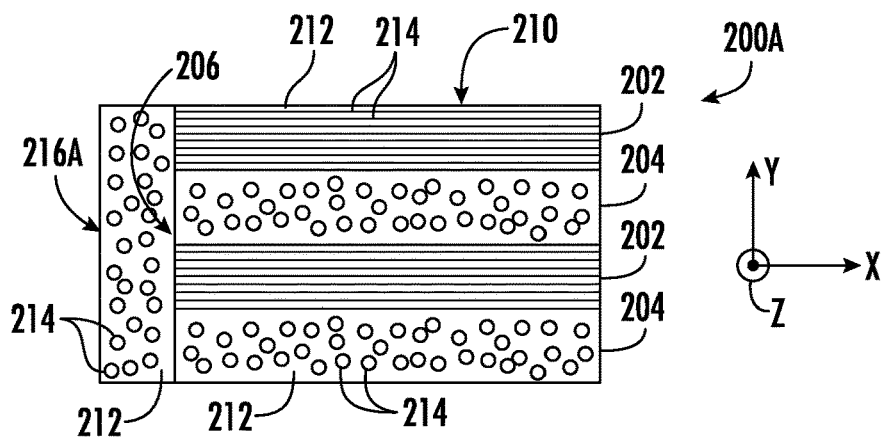
FIG. 3A is a cross-section of a CMC component in accordance with one embodiment of the present disclosure.
Figure 3B:
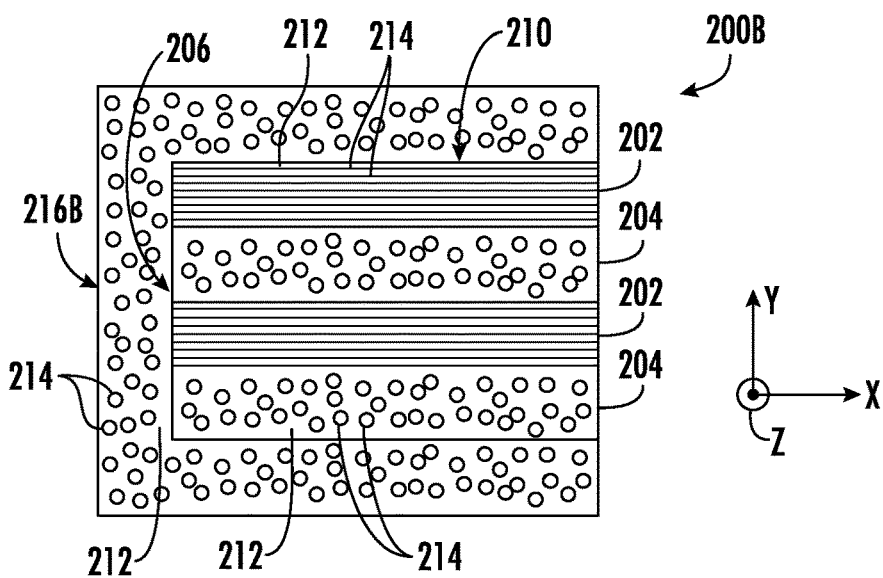
FIG. 3B illustrates a cross-section of a CMC component in accordance with another embodiment of the present disclosure.
Figure 3C:
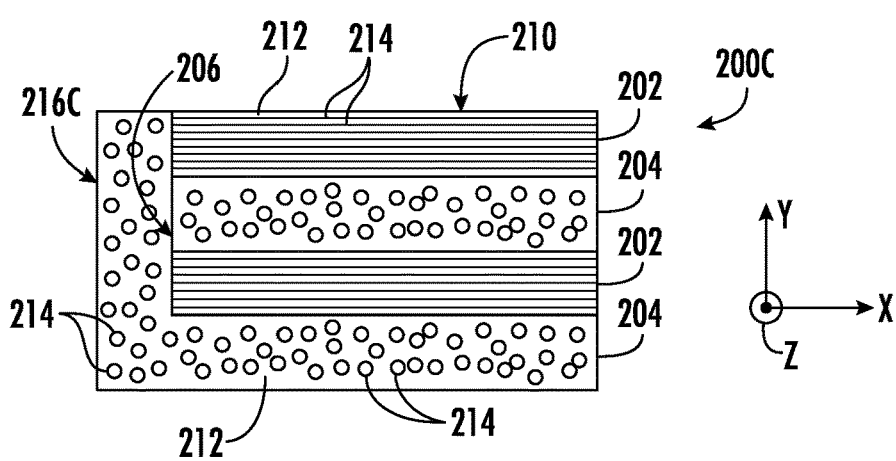
FIG. 3C illustrates a cross-section of a CMC component in accordance with still another embodiment of the present disclosure.
Figure 3D:
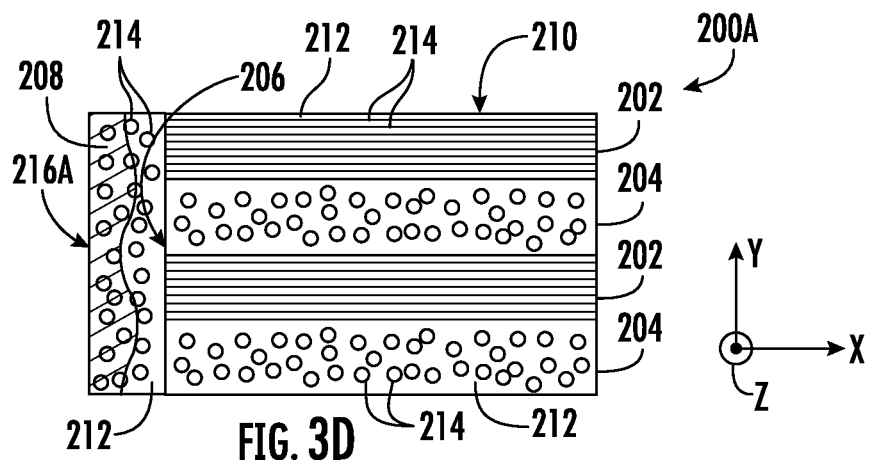
FIG. 3D is a cross-section of a CMC component in accordance with one embodiment of the present disclosure, particularly illustrating the CMC component having an edge crack.
Figure 3E:
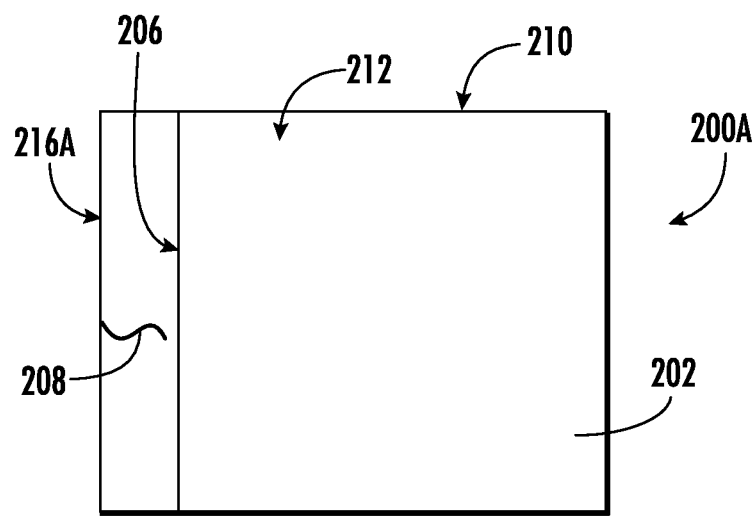
FIG. 3E is a top view of the CMC component of FIG. 3C, particularly illustrating the edge crack in the CMC component.

Referring now to FIGS. 3A-3C, various views of embodiments of a CMC component 200A, 200B, 200C in accordance with an embodiment of the present disclosure are illustrated. In particular, as shown, FIG. 3A illustrates a cross-section of an embodiment of a CMC component 200A in accordance with one embodiment of the present disclosure. FIG. 3B illustrates a cross-section of an embodiment of CMC component 200B in accordance with another embodiment of the present disclosure. FIG. 3C illustrates a cross-section of an embodiment of a CMC component 200C in accordance with still another embodiment of the present disclosure. FIG. 3D illustrates a cross-section of the CMC component 200A of FIG. 3A in accordance with one embodiment of the present disclosure, particularly illustrating the CMC component 200A having a translaminar matrix crack 208 (also referred to herein as simply an edge crack 208). FIG. 3E illustrates a top view of the CMC component 200A of FIG. 3D, particularly illustrating the translaminar matrix crack 208 in the CMC component 200A spanning the plies 202, 204 thereof.

More particularly, as shown, the CMC components described herein 200A, 200B, 200C are laminated from unidirectional prepreg tape or constructed of a two-dimensional preform containing layers of aligned, continuous fibers and includes a plurality of CMC plies 202, 204. For example, as shown, the plurality of plies 202, 204 include, at least, a first CMC ply 202 and a second CMC ply 204 stacked together to form a laminate structure 210 having at least one edge 206. In an embodiment, for example, the first CMC ply 202 may be one of a first set of CMC plies 202 and the second CMC ply 204 may be one of a second set of CMC plies 204.

Furthermore, in an embodiment, the first CMC ply 202 (or first set of CMC plies 202) are formed from a CMC material 212 reinforced with a fiber material 214 having a first fiber orientation. For example, as shown in FIGS. 3A-3D, the first fiber orientation (i.e., a direction of the individual fibers in the ply) is parallel with direction X of the coordinate axes. Moreover, as shown, the second CMC ply 204 (or second set of CMC plies 204) are formed from the CMC material 212 reinforced with the fiber material 214 having a second fiber orientation. However, as shown in FIGS. 3A-3D, the second fiber orientation is parallel with direction Z of the coordinate axes that extends into or out of the page. Thus, as shown in FIGS. 3A-3D, the first and second CMC plies 202, 204 are stacked together in an alternating or cross-ply pattern in a plane (such as the X-Y plane) of the laminate structure 210. In other words, as shown, the first set of CMC plies 202 having the first fiber orientation may be alternated with the second set of CMC plies 204 having the second fiber orientation.

Still referring to FIGS. 3A-3E, the CMC components 200A, 200B, 200C described herein further includes at least one end cap ply 216A, 216B, 216C covering at least a portion of the edge 206 of the laminate structure 210. It should be understood that a single end cap ply 216A, 216B, 216C is illustrated in FIGS. 3A-3D for purposes of simplifying the figures, however, one of ordinary skill in the art would appreciate that the CMC components 200A, 200B, 200C may include a plurality of end cap plies 216A, 216B, 216C covering at least a portion of the edge 206. Moreover, as shown in FIGS. 3A-3D, the end cap ply 216A, 216B, 216C may be laid up such that at least a portion of the end cap ply 216A, 216B, 216C completely covers the edge 206. In further embodiments, as shown in FIGS. 3B and 3C, the end cap ply 216B, 216C may be wrapped around the edge 206 and at least a portion of one or more of the first and second CMC plies 202, 204. Moreover, in another embodiment, the end cap ply 216B, 216C may be integral with the first CMC ply 202 or the second CMC ply 204. For example, as shown in FIG. 3C, the end cap ply 216C is integral with one of the second CMC plies 204.

Moreover, similar to the first and second CMC plies 202, 204, the end cap ply 216A, 216B, 216C may be formed of the CMC material 212 reinforced with the fiber material 214 having a third fiber orientation. In an embodiment, as shown, the third fiber orientation may be the same as the first fiber orientation of the first set of CMC plies 202. In another embodiment, the third fiber orientation may be the same as the second fiber orientation of the second set of CMC plies 204. In addition, as shown, at least a portion of a plane of the end cap ply 216A, 216B, 216C is generally laid up perpendicular to a plane of the laminate structure 210.

As shown in FIGS. 3D and 3E, in-plane tensile stress on the edge 206 of the CMC component 200A can initiate the edge crack 208 or cause the edge crack 208 to grow from a pre-existing flaw or scratch. Such crack(s) 208 are generally resisted by bridging fibers running perpendicular to the crack plane (e.g., the fiber material 214 in the first CMC plies 202). However, in instances where half or more of the plies in the CMC component offer no bridging fibers to resist the edge 208, as shown particularly in FIGS. 3D and 3E, the end cap ply 216A is oriented such that the fiber material having the third fiber orientation in the end cap ply 216A is configured to bridge the edge crack 208 on or in the edge 206 of the laminate structure 210. Accordingly, in such embodiments, the end cap ply 216A is configured to at least double a resistance to edge cracks on or in the edge 206 and/or to resist a propagation of edge cracks.

Though the CMC material 212 and the fiber material 214 of each of the first and second CMC plies and the end cap ply 216A, 216B, 216C are referred to herein as being the same material, one of ordinary skill in the art would recognize that such materials may also vary across plies. Thus, the first CMC ply may be formed of a first CMC material and/or a first fiber material, the second CMC ply may be formed of a second CMC material and/or a second fiber material, and the end cap ply may be formed of a third CMC material and/or a third fiber material, with the first, second, and third CMC materials and/or the first, second, and third fiber materials in each ply being different.

Furthermore, the CMC materials described herein are generally low ductility and low coefficient of thermal expansion materials. In addition, typically, CMC materials include a ceramic fiber, for example, a silicon carbide (SiC), forms of which are coated with a compliant material such as boron nitride (BN). The fiber materials may be coated in a ceramic type matrix, one form of which is silicon carbide (SiC). In addition, CMC materials generally have room temperature tensile ductility of less than or equal to about 1%. Generally, CMC materials have a room temperature tensile ductility in the range of about 0.4% to about 0.7%. When formed into continuous-fiber plies, CMC materials have a characteristic wherein the tensile strength of the ply in the direction parallel to the length of the fibers (the "fiber direction") is stronger than the tensile strength in the direction perpendicular. This perpendicular direction may include matrix, interlaminar, secondary or tertiary fiber directions. Various physical properties may also differ between the fiber and the matrix directions.

Figure 4A:
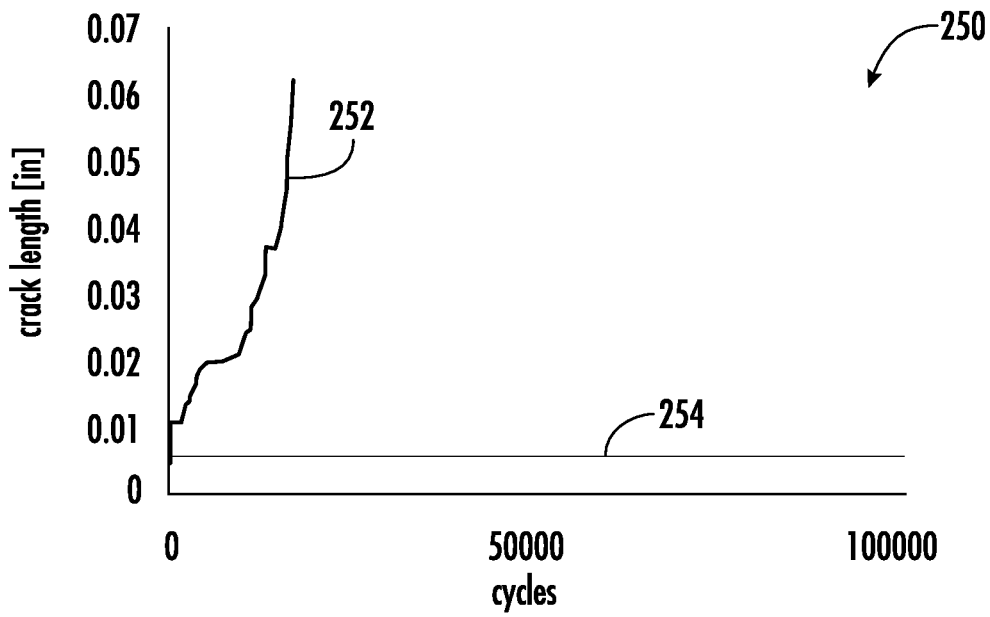
FIG. 4A is a graph of crack length (y-axis) versus cycles (x-axis) in accordance with one embodiment of the present disclosure, particularly illustrating CMC components under low loads with and without an end cap ply in which the CMC component having the end cap ply shows no crack propagation.
Figure 4B:
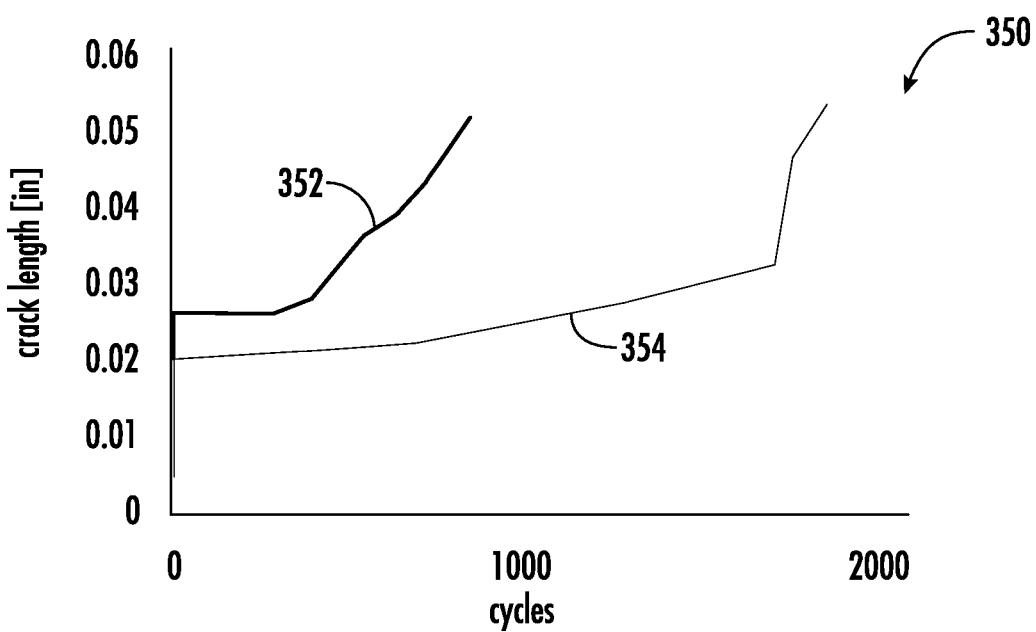
FIG. 4B is a graph of crack length (y-axis) versus cycles (x-axis) for high loads in accordance with one embodiment of the present disclosure, particularly illustrating CMC components under high loads with and without an end cap ply in which the CMC components having the end cap ply has slower crack propagation over the same number of cycles as compared to CMC components without the end cap ply.

Referring now to FIGS. 4A and 4B, graphs 250, 350 of crack length (y-axis) versus cycles (x-axis) in accordance with various embodiments of the present disclosure are provided. Furthermore, FIGS. 4A and 4B illustrate a benefit of the end cap ply for the case of a fatigue crack that grows incrementally during each of many loading cycles for an embodiment of the present disclosure. In other embodiments, those skilled in the art will recognize that the end cap ply will contribute a similar crack-propagating inhibiting effect in the case of cracks that grow rapidly during a single load cycle.

In particular, FIG. 4A illustrates a graph 250 of crack length (y-axis) versus cycles (x-axis) in accordance with one embodiment of the present disclosure, particularly illustrating CMC components under low loads with and without an end cap ply in which the CMC component having the end cap ply shows no crack propagation. FIG. 4B illustrates a graph 350 of crack length (y-axis) versus cycles (x-axis) for high loads in accordance with one embodiment of the present disclosure, particularly illustrating CMC components under high loads with and without an end cap ply in which the CMC components having the end cap ply has slower crack propagation over the same number of cycles as compared to CMC components without the end cap ply. Thus, as shown in graph 250 of FIG. 4A, for lower loading scenarios, crack length increases with increasing loading cycles in CMC components without an end cap ply (represented by curve 252) versus CMC components with an end cap ply (represented by curve 254). In other words, for lower loading scenarios, the fatigue life of CMC components with an end cap ply is significantly improved since the crack generally cannot propagate beyond the end cap ply. Moreover, as shown in graph 350 of FIG. 4B, for higher loading scenarios, crack length increases with increasing loading cycles in CMC components without an end cap ply (represented by curve 352) at a faster rate than CMC components with an end cap ply (represented by curve 354). In other words, for higher loading scenarios, CMC components with an end cap ply can more than double the fatigue life of the CMC component (e.g., as shown from 1000 to 2000 cycles) since the growth rate of the crack will be inhibited while it is within the end cap ply.

Figure 5:
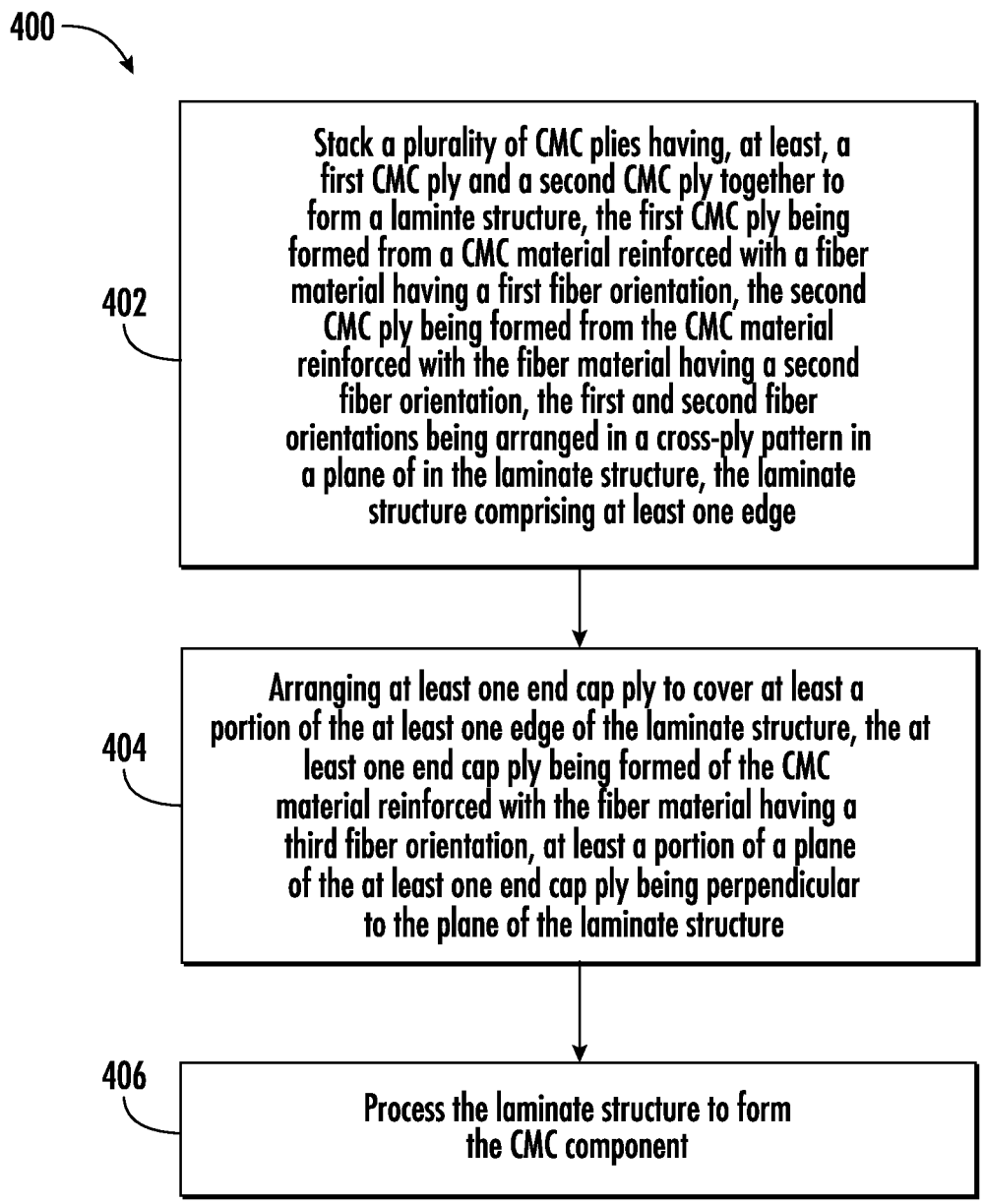
FIG. 5 is a flowchart of an exemplary method of forming a CMC component in accordance with one embodiment of the present disclosure.

Referring now to FIG. 5, a flow diagram of an embodiment of a method 400 of forming a CMC component is provided. In particular, the method 400 can be used with respect to the CMC component(s) 200A, 200B, 200C or any other CMC component configuration. However, it should be appreciated that the exemplary method 400 is discussed herein only to describe exemplary aspects of the present disclosure and is not intended to be limiting. Further, though FIG. 5 depicts a method having steps performed in a particular order for purposes of illustration and discussion, those of ordinary skill in the art, using the disclosures provided herein, will understand that the steps of any of the methods discussed herein can be adapted, rearranged, expanded, omitted, or modified in various ways without deviating from the scope of the present disclosure.

As shown at (402), the method 400 includes stacking a plurality of CMC plies having, at least, a first CMC ply and a second CMC ply together to form a laminate structure, the first CMC ply being formed from a CMC material reinforced with a fiber material having a first fiber orientation, the second CMC ply being formed from the CMC material reinforced with the fiber material having a second fiber orientation, the first and second fiber orientations being arranged in a cross-ply pattern in a plane of in the laminate structure, the laminate structure comprising at least one edge. As shown at (404), the method 400 includes arranging at least one end cap ply to cover at least a portion of the edge of the laminate structure, the at least one end cap ply being formed of the CMC material reinforced with the fiber material having a third fiber orientation, the at least one end cap ply being perpendicular to the plane of the laminate structure. As shown at (406), the method 400 includes processing the laminate structure to form the CMC component. For example, in an embodiment, processing the laminate structure to form the CMC component may include compaction, burnout, melt infiltration, applying pressure to the CMC plies and/or the end cap ply, and/or applying heat to the CMC plies and the end cap ply to form the CMC component.

Figure 6:
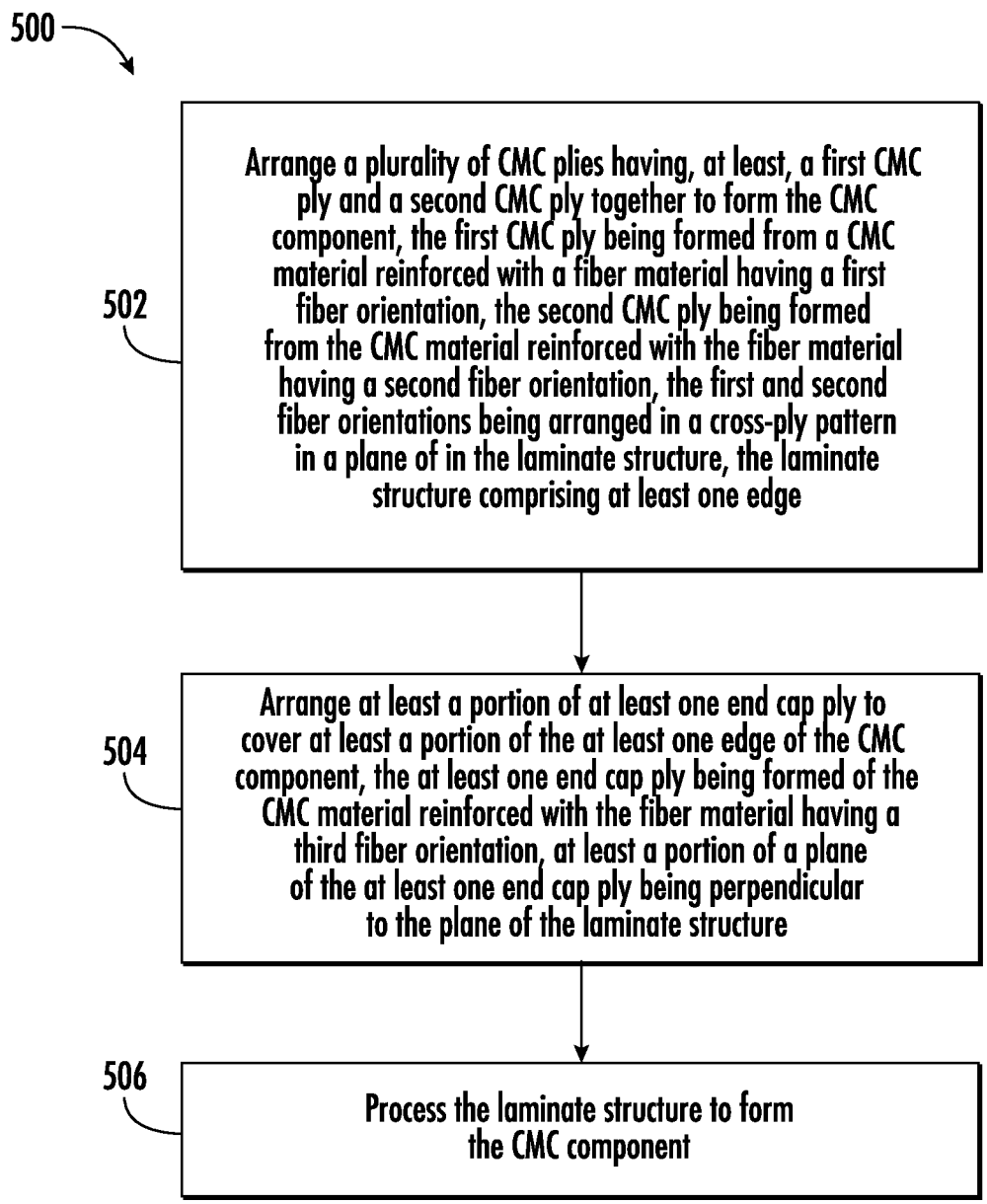
FIG. 6 is a flowchart of an exemplary method of upgrading or repairing a CMC component in accordance with one embodiment of the present disclosure.

Referring now to FIG. 6, a flow diagram of an embodiment of a method 500 of upgrading or repairing a CMC component is provided. In particular, the method 500 can be used with respect to the CMC component(s) 200A, 200B, 200C or any other CMC component configuration. However, it should be appreciated that the exemplary method 500 is discussed herein only to describe exemplary aspects of the present disclosure and is not intended to be limiting. Further, though FIG. 6 depicts a method having steps performed in a particular order for purposes of illustration and discussion, those of ordinary skill in the art, using the disclosures provided herein, will understand that the steps of any of the methods discussed herein can be adapted, rearranged, expanded, omitted, or modified in various ways without deviating from the scope of the present disclosure.

As shown at (502), the method 500 includes arranging a plurality of CMC plies having, at least, a first CMC ply and a second CMC ply together to form the CMC component, the first CMC ply being formed from a CMC material reinforced with a fiber material having a first fiber orientation, the second CMC ply being formed from the CMC material reinforced with the fiber material having a second fiber orientation, the first and second fiber orientations being arranged in a cross-ply pattern in a plane of in the laminate structure, the laminate structure comprising at least one edge. As shown at (504), the method 500 includes arranging at least one end cap ply to cover at least a portion of the edge of the CMC component, the at least one end cap ply being formed of the CMC material reinforced with the fiber material having a third fiber orientation, the at least one end cap ply being perpendicular to the plane of the laminate structure. As shown at (506), the method 500 also includes processing the laminate structure to upgrade or repair the CMC component. For example, as mentioned, processing the laminate structure to form the CMC component may include compaction, burnout, melt infiltration, applying pressure to the CMC plies and/or the end cap ply, and/or applying heat to the CMC plies and the end cap ply to form the CMC component.

Further aspects of the present disclosure are provided by the subject matter of the following clauses:

A ceramic matrix composite (CMC) component, comprising: a plurality of CMC plies comprising, at least, a first CMC ply and a second CMC ply stacked together to form a laminate structure, the first CMC ply being formed from a CMC material reinforced with a fiber material having a first fiber orientation, the second CMC ply being formed from the CMC material reinforced with the fiber material having a second fiber orientation, the first and second fiber orientations being arranged in a cross-ply pattern in a plane of the laminate structure, the laminate structure comprising at least one edge; and at least one end cap ply covering at least a portion of the at least one edge of the laminate structure, the at least one end cap ply being formed of the CMC material reinforced with the fiber material having a third fiber orientation, wherein the at least one end cap ply is perpendicular to the plane of the laminate structure.

The CMC component of any preceding clause, wherein the at least one end cap ply is laid up such that the at least one end cap ply completely covers the at least one edge.

The CMC component of any preceding clause, wherein the at least one end cap ply is wrapped around the at least one edge and at least a portion of each of the first and second CMC plies.

The CMC component of any preceding clause, wherein the at least one end cap ply is oriented such that the fiber material having the third fiber orientation in the at least one end cap ply is configured to bridge a translaminar matrix crack on or in the laminate structure.

The CMC component of any preceding clause, wherein the at least one end cap ply at least doubles a resistance to edge cracks in the at least one edge.

The CMC component of any preceding clause, wherein the at least one end cap ply is integral with at least one of the first CMC ply or the second CMC ply.

The CMC component of any preceding clause, further comprising a plurality of end cap plies covering at least a portion of the at least one edge, wherein the at least one end cap ply is one of the plurality of end cap plies.

The CMC component of any preceding clause, wherein the first CMC ply is part of a first set of CMC plies and the second CMC ply is part of a second set of CMC plies, the first and second fiber orientations of the first and second sets of CMC plies being arranged in the cross-ply pattern.

A component of a gas turbine engine comprising the CMC component of any preceding clause.

A method of forming a ceramic matrix composite (CMC) component, the method comprising: stacking a plurality of CMC plies having, at least, a first CMC ply and a second CMC ply together to form a laminate structure, the first CMC ply being formed from a CMC material reinforced with a fiber material having a first fiber orientation, the second CMC ply being formed from the CMC material reinforced with the fiber material having a second fiber orientation, the first and second fiber orientations being arranged in a cross-ply pattern in a plane of in the laminate structure, the laminate structure comprising at least one edge; arranging at least one end cap ply to cover at least a portion of the at least one edge of the laminate structure, the at least one end cap ply being formed of the CMC material reinforced with the fiber material having a third fiber orientation, at least a portion of a plane of the at least one end cap ply being perpendicular to the plane of the laminate structure; and processing the laminate structure to form the CMC component.

The method of any preceding clause, further comprising laying up the at least one end cap ply such that the at least one end cap ply completely covers the at least one edge.

The method of any preceding clause, further comprising wrapping the at least one end cap ply around the at least one edge and at least a portion of each of the first and second CMC plies.

The method of any preceding clause, wherein the at least one end cap ply is oriented such that the fiber material having the third fiber orientation in the at least one end cap ply is configured to bridge a translaminar matrix crack on or in the laminate structure.

The method of any preceding clause, wherein the at least one end cap ply at least doubles a resistance to edge cracks in the at least one edge.

The method of any preceding clause, wherein the at least one end cap ply is integral with at least one of the first CMC ply or the second CMC ply.

The method of any preceding clause, wherein the at least one end cap ply is one of a plurality of end cap plies, the method further comprising arranging the plurality of end cap plies to cover at least the portion of the at least one edge of the laminate structure.

The method of any preceding clause, wherein the first CMC ply is part of a first set of CMC plies and the second CMC ply is part of a second set of CMC plies, the first and second fiber orientations of the first and second sets of CMC plies being arranged in the cross-ply pattern.

A method of upgrading or repairing a ceramic matrix composite (CMC) component, the method comprising: arranging a plurality of CMC plies having, at least, a first CMC ply and a second CMC ply together to form a laminate structure, the first CMC ply being formed from a CMC material reinforced with a fiber material having a first fiber orientation, the second CMC ply being formed from the CMC material reinforced with the fiber material having a second fiber orientation, the first and second fiber orientations being arranged in a cross-ply pattern in a plane of the laminate structure, the laminate structure comprising at least one edge; arranging at least one end cap ply to cover at least a portion of the at least one edge of the CMC component, the at least one end cap ply being formed of the CMC material reinforced with the fiber material having a third fiber orientation, at least a portion of a plane of the at least one end cap ply being perpendicular to the plane of the laminate structure; and processing the laminate structure to form the CMC component.

The method of any preceding clause, further comprising laying up the at least one end cap ply such that the at least one end cap ply completely covers the at least one edge.

The method of any preceding clause, further comprising wrapping the at least one end cap ply around the at least one edge and at least a portion of each of the first and second CMC plies.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A ceramic matrix composite (CMC) component, comprising:
    a plurality of CMC plies comprising, at least, a first CMC ply and a second CMC ply stacked together to form a laminate structure,
    the first CMC ply being formed from a CMC material reinforced with a fiber material having a first fiber orientation, the second CMC ply being formed from the CMC material reinforced with the fiber material having a second fiber orientation,
    the first and second fiber orientations being arranged in a cross-ply pattern in a plane of the laminate structure, the laminate structure comprising at least one edge; and
    at least one end cap ply covering at least a portion of the at least one edge of the laminate structure, the at least one end cap ply being formed of the CMC material reinforced with the fiber material having the first fiber orientation or the second fiber orientation,
    wherein at least a portion of a plane of the at least one end cap ply is perpendicular to the plane of the laminate structure.

2. The CMC component of claim 1, wherein the at least one end cap ply is laid up such that the at least one end cap ply completely covers the at least one edge.

3. The CMC component of claim 1, wherein the at least one end cap ply is wrapped around the at least one edge and at least a portion of each of the first and second CMC plies.

4. The CMC component of claim 1, wherein the at least one end cap ply is oriented such that the fiber material in the at least one end cap ply is configured to bridge a translaminar matrix crack on or in the laminate structure.

5. The CMC component of claim 1, wherein the at least one end cap ply at least doubles a resistance to edge cracks in the at least one edge.

6. The CMC component of claim 1, wherein the at least one end cap ply is integral with at least one of the first CMC ply or the second CMC ply.

7. The CMC component of claim 1, further comprising a plurality of end cap plies covering at least a portion of the at least one edge, wherein the at least one end cap ply is one of the plurality of end cap plies.

8. The CMC component of claim 1, wherein the first CMC ply is part of a first set of CMC plies and the second CMC ply is part of a second set of CMC plies, the first and second fiber orientations of the first and second sets of CMC plies being arranged in the cross-ply pattern.

9. A component of a gas turbine engine comprising the CMC component of claim 1.

10. A method of forming a ceramic matrix composite (CMC) component, the method comprising:
    stacking a plurality of CMC plies having, at least, a first CMC ply and a second CMC ply together to form a laminate structure, the first CMC ply being formed from a CMC material reinforced with a fiber material having a first fiber orientation, the second CMC ply being formed from the CMC material reinforced with the fiber material having a second fiber orientation, the first and second fiber orientations being arranged in a cross-ply pattern in a plane of in the laminate structure, the laminate structure comprising at least one edge;

arranging at least one end cap ply to cover at least a portion of the at least one edge of the laminate structure, the at least one end cap ply being formed of the CMC material reinforced with the fiber material having the first fiber orientation or the second fiber orientation, at least a portion of a plane of the at least one end cap ply being perpendicular to the plane of the laminate structure; and processing the laminate structure to form the CMC component.

11. The method of claim 10, further comprising laying up the at least one end cap ply such that the at least one end cap ply completely covers the at least one edge.

12. The method of claim 10, further comprising wrapping the at least one end cap ply around the at least one edge and at least a portion of each of the first and second CMC plies.

13. The method of claim 10, wherein the at least one end cap ply is oriented such that the fiber material in the at least one end cap ply is configured to bridge a translaminar matrix crack on or in the laminate structure.

14. The method of claim 10, wherein the at least one end cap ply at least doubles a resistance to edge cracks in the at least one edge.

15. The method of claim 10, wherein the at least one end cap ply is integral with at least one of the first CMC ply or the second CMC ply.

16. The method of claim 10, wherein the at least one end cap ply is one of a plurality of end cap plies, the method further comprising arranging the plurality of end cap plies to cover at least the portion of the at least one edge of the laminate structure.

17. The method of claim 10, wherein the first CMC ply is part of a first set of CMC plies and the second CMC ply is part of a second set of CMC plies, the first and second fiber orientations of the first and second sets of CMC plies being arranged in the cross-ply pattern.

18. A method of upgrading or repairing a ceramic matrix composite (CMC) component, the method comprising:

arranging a plurality of CMC plies having, at least, a first CMC ply and a second CMC ply together to form a laminate structure, the first CMC ply being formed from a CMC material reinforced with a fiber material having a first fiber orientation, the second CMC ply being formed from the CMC material reinforced with the fiber material having a second fiber orientation, the first and second fiber orientations being arranged in a cross-ply pattern in a plane of the laminate structure, the laminate structure comprising at least one edge;

arranging at least one end cap ply to cover at least a portion of the at least one edge of the CMC component, the at least one end cap ply being formed of the CMC material reinforced with the fiber material having the first fiber orientation or the second fiber orientation, at least a portion of a plane of the at least one end cap ply being perpendicular to the plane of the laminate structure; and processing the laminate structure to form the CMC component.

19. The method of claim 18, further comprising laying up the at least one end cap ply such that the at least one end cap ply completely covers the at least one edge.

20. The method of claim 18, further comprising wrapping the at least one end cap ply around the at least one edge and at least a portion of each of the first and second CMC plies.

* * * * *